United States Patent [19]

Yelton

[11] 4,422,767

[45] Dec. 27, 1983

[54] COMBINATION MOUNTING RING AND CATCH BASIN FOR CONCRETE TRUCKS

[76] Inventor: James E. Yelton, 640 Kingswood, Eugene, Oreg. 97405

[21] Appl. No.: 277,397

[22] Filed: Jun. 25, 1981

[51] Int. Cl.³ .......................... B28C 7/06; B28C 7/12; B65G 45/00
[52] U.S. Cl. ..................................... 366/40; 198/495; 198/497; 366/64; 366/138; 414/505
[58] Field of Search ..................... 414/505, 523, 526; 198/495, 497, 499, 560, 587; 366/6, 40, 64, 138

[56] References Cited

U.S. PATENT DOCUMENTS

| | | |
|---|---|---|
| 1,534,411 | 6/1925 | Wittig . |
| 1,793,246 | 2/1931 | Philips ............................. 198/495 |
| 3,171,534 | 3/1965 | Oury ............................... 198/497 |
| 3,310,293 | 3/1967 | Zimmerman ....................... 366/6 |
| 3,402,805 | 9/1968 | Spellman . |
| 3,815,728 | 6/1974 | Vaughan . |
| 3,875,613 | 4/1975 | Pincus . |
| 4,182,444 | 1/1980 | Fisher . |

Primary Examiner—Robert G. Sheridan
Attorney, Agent, or Firm—James D. Givnan, Jr.

[57] ABSTRACT

A mounting ring carried by a truck frame supports a swingably positionable mixing and delivery trough by which concrete ingredients are mixed and poured at a site. A catch basin is carried by the mounting ring and provides both nozzles and scraper means serving to purge the belt surface of particles. Barriers at the basin sides laterally confine the purged particles. Positionable scrapers carried by the catch basin are swingable to an inoperable rearward position to permit access to the catch basin for periodic cleaning. Water and particulate are removed from the belt surface to enhance belt life and thence are routed from the catch basin back into the normal flow of concrete ingredients and into the delivery trough. Nozzle sprays, in addition to belt washing, may provide the total water required for the concrete mix.

4 Claims, 4 Drawing Figures

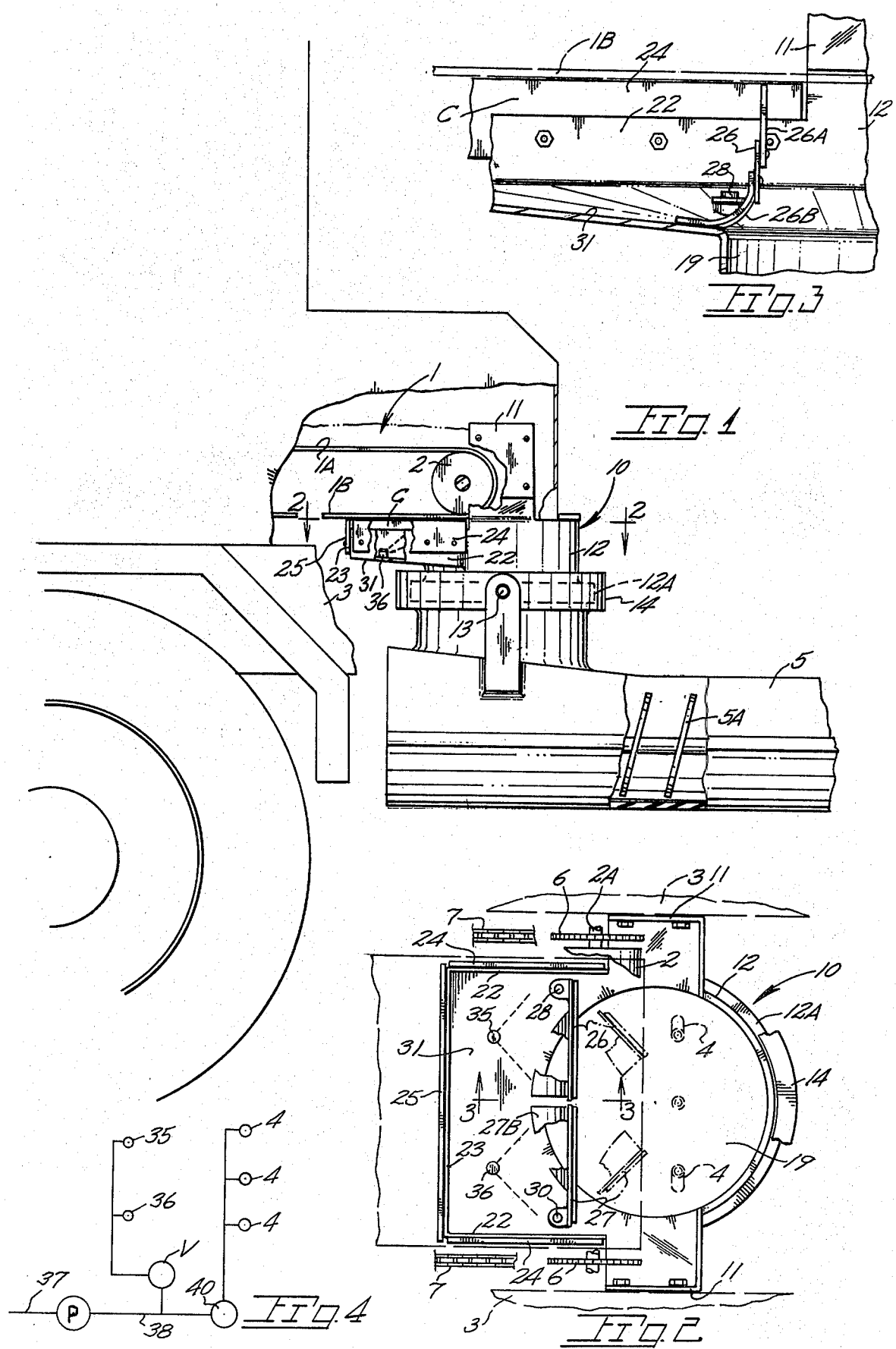

COMBINATION MOUNTING RING AND CATCH BASIN FOR CONCRETE TRUCKS

BACKGROUND OF THE INVENTION

The present invention relates generally to a belt cleaning arrangement disposed adjacent the end of a conveyor belt to remove all traces of conveyed material.

In use presently are trucks which transport unmixed concrete materials to a using site whereat they are mixed and discharged. Stone, sand and cement are transported in bins and combined on a truck mounted conveyor belt. Water is added prior to discharge of the ingredients at a pour site. U.S. Pat. Nos. 3,310,293 and 3,339,898 disclose both truck and mixing trough structure analogous to that currently used on such trucks.

Existing belt arrangements on such trucks make no provision for washing of the belt exterior surface on the lower or return belt run. A scraper is provided but is of reduced effectiveness after wear of the scraper blade. During a delivery operation, that street or ground area below the truck is usually contaminated by concrete ingredients. The truck operator, in some locales, must expend time and effort to clean up the site prior to departure or otherwise subject the truck owner to a fine for violating various environmental ordinances.

A further drawback to known conveyor construction is the loss of those materials which cling to the belt return run and ultimately fall onto the ground. While each instance of an unloading operation results in but a relatively small loss, the cumulative loss over several months is of some value.

Further, belt life is markedly diminished by the accumulation of concrete ingredient particles thereon which particles may ultimately work themselves to the inner side of the belt.

To the extent known, the prior art discloses the general concept of belt cleaning utilizing brushes, scrapers, etc., along with water sprays but does not provide same useable in a manner compatible with the conveyor of a concrete truck nor in combination with a mounting ring supporting a delivery trough common to such machines. Belt cleaning arrangements using water, air, brushes and/or scrapers are disclosed in the following U.S. Pat. Nos. 263,634; 1,543,411; 3,414,116; 1,793,246; 3,815,728; 3,875,613; 3,865,232; 4,182,444 and 3,402,805 all disclosed without regard to a mounting ring assembly.

SUMMARY OF THE PRESENT INVENTION

The present invention is embodied within a mounting ring assembly which rotatably supports one end of a delivery trough and is modified to further serve to clean the underside of a conveyor belt and direct the purged material toward the belt discharge area.

Presently in wide use are trucks equipped with multiple bins and within each bin is transported stone, sand and cement in a separated manner. These dry ingredients for concrete are transported to a site whereat they are dispensed in a controlled manner onto a single conveyor belt at stations therealong. At belt discharge, water is added to the mix whereupon the admixture is deposited into an auger equipped delivery trough. Passage of the ingredients along the trough results in the mixing of the concrete ingredients prior to discharge at the trough end at the pour site.

The present invention is located generally below the offloading end of the belt conveyor and extends below the initial return or lower segment of the belt. Scrapers and water sprays are provided which act on the belt underside. A catch basin is provided integral with a trough mounting ring to collect the particles purged from the belt and to direct same back into their intended course of flow. Additional barriers at the belt sides partially define a cleaning chamber and serve to protect adjacent belt drive roller chains. Positionable scrapers in the catch basin are movable from their normal transverse position to permit access to the catch basin for periodic cleaning of same. Water sprays are directed so as to cause the water flow to be applied to belt surfaces passing through the above noted cleaning chamber.

Important objectives of the present invention include the provision of a modified mounting ring assembly with a belt cleaning capability and which lends itself to convenient incorporation into existing structure of the concrete truck; the provision of a mounting ring assembly which can be readily installed within the limited space available without costly modification of the truck components; the provision of a mounting ring assembly using controllable water sprays which, in relatively "stiff" mixes, may supply all of the water required for concrete mixing; the provision of a belt cleaning assembly including positionable scraper means to facilitate through periodic cleaning of the catch basin from a point rearward of the belt return roll. These and other objectives will become subsequently apparent upon an understanding of the following description.

BRIEF DESCRIPTION OF THE DRAWING

In the drawing:

FIG. 1 is a fragmentary side elevational view of a concrete ingredient carrying truck with parts broken away to disclose the present assembly in side elevation;

FIG. 2 is a horizontal plan view of the present assembly taken along line 2—2 of FIG. 1;

FIG. 3 is a vertical sectional view taken along line 3—3 of FIG. 2; and

FIG. 4 is a schematic view of a water supply system serving the present mounting ring assembly.

DETAILED DESCRIPTION OF THE PREFERRED EMBODIMENT

With continuing reference to the drawing, the reference numeral 1 indicates generally a concrete ingredient conveyor belt having an upper or delivery run 1A and the end segment of a lower or return run 1B. A conveyor roll at 2 is suitably journaled in bearings (not shown) in place on the wheel supported truck chassis at 3. Roller chains 7 drive sprockets 6 (as shown in FIG. 2) on roll shaft 2A. The conveyor extends lengthwise of the truck payload area and below the discharge openings of separate stone, sand and cement bins. Metered amounts of these ingredients are deposited on belt upper run 1A for discharge immediately aft of roll 2. Slightly rearward of roll 2 are water outlets 4 which are valve regulated as later described to provide the type of concrete mix desired. Various operator controls enable varying of the concrete mixture as well as positioning of a delivery and mixing trough at 5 within which is a powered auger 5A by which the material is mixed and ultimately discharged at the trough unseen end. With attention to conveyor 1, roll shaft 2A is permanently journaled in chassis mounted bearings with the shaft mounted sprockets imparting rotation to the roll from the powered roller chains 7 offset somewhat from the belt sides.

Indicated generally at 10 is a mounting ring structure (later described as being modified per the present invention) including mounting plates at 11 apertured for bolted securement to the truck chassis. Said ring structure includes a cylindrical member 12 provided with an annular shoulder 12A which rotatably supports the forward or receiving end of the delivery trough 5. Trough structure 5 includes upstanding brackets carried by pintles 13 on a trough slewing ring 14 supported for travel about a vertical axis and the shoulder 12A of the stationary mounting ring.

The foregoing description is intended to describe that portion of a mobile concrete unit pertinent to an understanding of the present invention and of the general type of unit made and sold under the registered trademark Concrete-Mobile.

Now with attention to the present invention, the mounting ring structure generally at 10 is modified to include a forwardly (relative the truck) extending pan or catch basin having sidewalls at 22 merging with cylindrical member 12 and a front wall 23. Suitably secured to the sidewalls as by fasteners are semi-rigid barriers 24 oppositely disposed so as to be proximate the belt sides of the initial return or lower run of the belt. Immediately outward of each barrier 24 are conveyor drive roller chain segments 7 which are accordingly protected from abrasive material by the barriers. Front wall 23 of the pan supports semi-rigid scraper element 25 the upper edge of which is in light, transverse contact with the belt lower surface to dress off any particles and moisture droplets adhering thereto after belt discharge through ring structure opening 19.

Also in place on the pan structure are positionable scrapers at 26 and 27 each pivotally mounted on a pivot at 28 and 30 so as to be positionable from an operative or transversely disposed position to a rearwardly disposed position (broken line position in FIG. 2) whereat a basin bottom wall 31 is accessible from rearward of the conveyor roll for cleaning. Each of the movable scrapers includes an upstanding semi-rigid blade-type member 26A-27A. The uppermost edges of the last mentioned scrapers are located so as to act on the outer surface of the belt return run. To prevent upward random passage of the concrete material discharged by the belt, each movable scraper is provided with a baffle as at 26B-27B also of a semi-rigid nature. A suitable scraper material is neoprene cut from sheets approximately one-quarter inch thick.

Spray nozzles at 35 and 36 in place on pan bottom 31 have slotted orifices inclined upwardly so as to project a fan shaped spray rearwardly and upwardly to impinge that segment of the conveyor belt immediately after roll departure. The deflected spray and purged particles, to a great extent, drain downwardly through the mounting ring structure to be rejoined with the belt delivered ingredients. A valve at V (FIG. 4) controls spray volume. The valve may admit a combined flow of water to the nozzles adequate to supply the entire water requirement for the concrete being mixed. This is the case when the mix desired is what is termed a "stiff" mix. The nozzle sprays are substantially confined with a chamber C below the belt lower run and above the pan bottom and generally defined by the pan sidewalls, the sidewall mounted barriers, the front wall of the pan and the scraper mounted thereon and the movable scrapers located on bottom wall 31 subjacent the conveyor end.

The collected water along with particulate flows from pan 31 into mounting ring opening 19.

With attention to FIG. 4, a water control system is shown for the catch basin nozzles 35–36 which utilizes a pump P receiving water from a source conduit 37 and pressurizing a supply line 38. The foregoing heretofore provided a pressurized water supply to existing water outlets 4 above the ring opening. The discharge flow is controlled by a valve 40 set by the machine operator. A convenient source of water for present catch basin nozzles 35 and 36 is accomplished by the addition of valve V into branched supply conduit 38 to permit selective bleeding off of a portion of the water from conduit 38 for ultimate discharge via the spray nozzles. As above noted, in instances where a "stiff" mix is desired, all of the water required for such a mix may be discharged through the catch basin spray nozzles with valve 40 being closed.

Fastener assemblies mounting the scraper elements to supporting structure permit periodic upward adjustment of the scrapers to compensate for wear.

While I have shown but one embodiment of the invention it will be apparent to those skilled in the art that the invention may be embodied still otherwise without departing from the spirit and scope of the invention.

Having thus described the invention, what is desired to be secured under a Letters Patent is:

I claim:

1. A mounting ring assembly for attachment to a truck chassis and which rotatably supports one end of a delivery trough by which truck transported materials are mixed and discharged, a conveyor belt also supported by the truck chassis for the delivery of the materials to said delivery trough, said mounting ring assembly comprising, a ring structure through which materials are discharged and on which is rotatably mounted one end of the delivery trough permitting movement of the latter about a vertical axis, a catch basin carried by said ring structure and including a bottom wall, side walls and a front wall, means in place on the catch basin and contactable with the lower run of the conveyor belt, nozzles carried by the catch basin for directing a water spray upwardly against the belt lower run, said catch basin bottom wall in subjacent spaced relationship with a segment of the belt lower run and in discharge relationship with the ring structure whereby the nozzle spray and belt purged particles gravitate from the catch basin through the ring structure and into the delivery trough, and positionable means in place on the catch basin and contactable with the lower run of the conveyor belt, said positionable means normally located transversely below the belt run and swingable therefrom to an open position permitting access to the catch basin for periodic cleaning of same.

2. The mounting ring assembly claimed in claim 1 wherein said means in place on the catch basin and said positionable means partially define a chamber upwardly closed by the belt lower run, the nozzle spray and belt purged particles being confined within said chamber prior to gravitating into the catch basin and thence through the ring structure into the delivery trough.

3. The mounting assembly claimed in claim 1 wherein said positionable means additionally includes baffles to prevent a reverse flow of particulate from entering the catch basin.

4. The mounting ring assembly claimed in claim 1 additionally including a water control system serving said nozzles, said control system including valve means, a pressurized source of water in communication with said valve means whereby said valve means may be adjusted to provide a flow to said nozzles adequate to meet the water requirement for a concrete mixing discharged by the conveyor belt.

* * * * *